US009213162B2

(12) United States Patent
Togawa

(10) Patent No.: US 9,213,162 B2
(45) Date of Patent: Dec. 15, 2015

(54) LENS BARREL AND IMAGE CAPTURING APPARATUS

(75) Inventor: Hisanori Togawa, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 13/445,050

(22) Filed: Apr. 12, 2012

(65) Prior Publication Data

US 2012/0262807 A1   Oct. 18, 2012

Related U.S. Application Data

(60) Provisional application No. 61/607,093, filed on Mar. 6, 2012, provisional application No. 61/607,224, filed on Mar. 6, 2012.

(30) Foreign Application Priority Data

Apr. 12, 2011   (JP) .................................. 2011-088555
Jun. 30, 2011   (JP) .................................. 2011-146759

(51) Int. Cl.
*G02B 7/02*   (2006.01)
*G02B 7/10*   (2006.01)

(52) U.S. Cl.
CPC ...................................... *G02B 7/102* (2013.01)

(58) Field of Classification Search
USPC .................. 359/811, 813, 815, 819–824, 827
See application file for complete search history.

(56) References Cited

U.S. PATENT DOCUMENTS

| 5,878,287 | A | * | 3/1999 | Kohno | ............................. | 396/72 |
| 6,008,954 | A | | 12/1999 | Shintani et al. | | |
| 6,339,681 | B1 | * | 1/2002 | Takeshita | ......................... | 396/79 |
| 7,203,011 | B2 | * | 4/2007 | Ito et al. | ......................... | 359/811 |
| 8,437,094 | B2 | * | 5/2013 | Umezu | ......................... | 359/819 |
| 2006/0008264 | A1 | * | 1/2006 | Yamaguchi et al. | .......... | 396/121 |
| 2006/0098306 | A1 | | 5/2006 | Yoshitsugu et al. | | |
| 2006/0182432 | A1 | | 8/2006 | Yumiki | | |

(Continued)

FOREIGN PATENT DOCUMENTS

| CN | 1781048 A | 5/2006 |
| CN | 101464555 A | 6/2009 |

(Continued)

OTHER PUBLICATIONS

Japanese Office Action mailed Apr. 9, 2013 for corresponding Japanese Application No. 2011-088555.

(Continued)

*Primary Examiner* — Joseph P Martinez
*Assistant Examiner* — Brandi Thomas

(57) ABSTRACT

To decrease operating noise of actuators in a lens barrel, provided is a lens barrel comprising a first optical member that moves in an optical axis direction prior to image capturing and during image capturing; a first drive member that causes the first optical member to move in the optical axis direction during image capturing; a second optical member that has the first drive member fixed thereto, moves in the optical axis direction prior to image capturing, and is fixed at a position in the optical axis direction during image capturing; and a second drive member that causes the second optical member, the first optical member, and the first drive member to move in the optical axis direction prior to image capturing. Also provided is an image capturing apparatus comprising the lens barrel and an image capturing section that captures image light from the lens barrel.

19 Claims, 16 Drawing Sheets

(56) References Cited

U.S. PATENT DOCUMENTS

| | | |
|---|---|---|
| 2009/0091850 A1 | 4/2009 | Yumiki et al. |
| 2009/0161232 A1 | 6/2009 | Iwasaki |
| 2009/0231709 A1 | 9/2009 | Nomura et al. |

FOREIGN PATENT DOCUMENTS

| | | | |
|---|---|---|---|
| JP | 5-288975 | 11/1993 | |
| JP | 8-248291 | 9/1996 | |
| JP | 9-166742 | 6/1997 | |
| JP | 10-73855 | 3/1998 | |
| JP | 11-311734 | 11/1999 | |
| JP | 2000-1940 | 1/2000 | |
| JP | 2000-155255 | 6/2000 | |
| JP | 2000-194046 | 7/2000 | |
| JP | 2002-72087 | 3/2002 | |
| JP | 2004-163810 | * 11/2002 | ............... G02B 7/04 |
| JP | 2004-258641 | 9/2004 | |
| JP | 2005-128187 | 5/2005 | |
| JP | 2005-301021 | 10/2005 | |
| JP | 2006-259685 | 9/2006 | |
| JP | 2008-46626 | 2/2008 | |
| JP | 2009-244874 | 10/2009 | |

OTHER PUBLICATIONS

Japanese Office Action issued Sep. 10, 2013 in corresponding Japanese Application No. 2011-088555.

Chinese Office Action issued Dec. 22, 2014 in corresponding Chinese Patent Application No. 201210107227.7.

Japanese Office Action issued Jan. 28, 2014 in corresponding Japanese Patent Application No. 2011-088555.

Chinese Office Action dated Aug. 21, 2015 in corresponding Chinese Patent Application No. 201210107227.7.

* cited by examiner

| | EXTENSION OPERATION | MAGNIFICATION CHANGING OPERATION | FOCUSING OPERATION | CONTRACTION OPERATION |
|---|---|---|---|---|
| ACTUATOR 2228 (DC MOTOR) | ON | OFF | OFF | ON |
| ACTUATOR 238 (STEPPING MOTOR) | OFF | ON | ON | OFF |
| ACTUATORS 258 AND 268 (STEPPING MOTOR) | OFF | ON | OFF | OFF |

Fig. 7

LENS BARREL AND IMAGE CAPTURING APPARATUS

CROSS-REFERENCE TO RELATED APPLICATIONS

This application claims the priority benefit of U.S. Provisional Patent Application No. 61/607,093, filed Mar. 6, 2012, U.S. Provisional Patent Application No. 61/607,224, filed Mar. 6, 2012, Japanese Patent Application No. 2011-088555, filed on Apr. 12, 2011, and Japanese Patent Application No. 2011-0146759, filed Jun. 30, 2011, the disclosures of which are incorporated herein by reference.

BACKGROUND

1. Technical Field

The present invention relates to a lens barrel and an image capturing apparatus.

2. Related Art

There is an optical device in which the lens barrel is contracted when not in use to achieve small dimensions, as shown by Patent Document 1, for example. Furthermore, in the lens barrel, technology is proposed to pressure weld components to a stepping motor in order to restrict camera shake caused during operation, as shown by Patent Documents 2 and 3.

Patent Document 1: Japanese Patent Application Publication No. 2000-194046
Patent Document 2: Japanese Patent Application Publication No. H05-288975
Patent Document 3: Japanese Patent Application Publication No. H11-311734

A large output actuator capable of extending and contracting the lens barrel has loud operating noise. Therefore, the contracted optical device also generates operating noise when changing magnification and focusing. The operating noise can be recorded along with a moving image. Furthermore, the camera shake restriction effect of the above configuration is insufficient, and the remaining camera shake cannot be prevented from propagating along the surface of the lens barrel.

SUMMARY

According to a first aspect related to the innovations herein, provided is a lens barrel comprising a first optical member that moves in an optical axis direction prior to image capturing and during image capturing; a first drive member that causes the first optical member to move in the optical axis direction during image capturing; a second optical member that has the first drive member fixed thereto, moves in the optical axis direction prior to image capturing, and is fixed at a position in the optical axis direction during image capturing; and a second drive member that causes the second optical member, the first optical member, and the first drive member to move in the optical axis direction prior to image capturing.

According to a second aspect related to the innovations herein, provided is an image capturing apparatus comprising the lens barrel and an image capturing section that captures image light from the lens barrel.

According to a third aspect related to the innovations herein, provided is a lens barrel comprising a lens holder that holds a lens; a drive axle that drives the lens holder in a direction parallel to an optical axis of the lens; a motor that applies a drive force to the drive axle; a case that houses the motor and the drive axle; and a movable member that moves integrally with the case in the direction of the optical axis, while supporting the case in a cantilevered manner at one end of the case in an axial direction of the drive axle.

According to a fourth aspect related to the innovations herein, provided is an image capturing apparatus comprising the lens barrel described above; and an image capturing element that captures image light incident thereto through an optical system of the lens barrel.

The summary clause does not necessarily describe all necessary features of the embodiments of the present invention. The present invention may also be a sub-combination of the features described above.

BRIEF DESCRIPTION OF THE DRAWINGS

FIG. 7 is a chart showing the operating states of the actuators 228, 238, 258 and 268.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
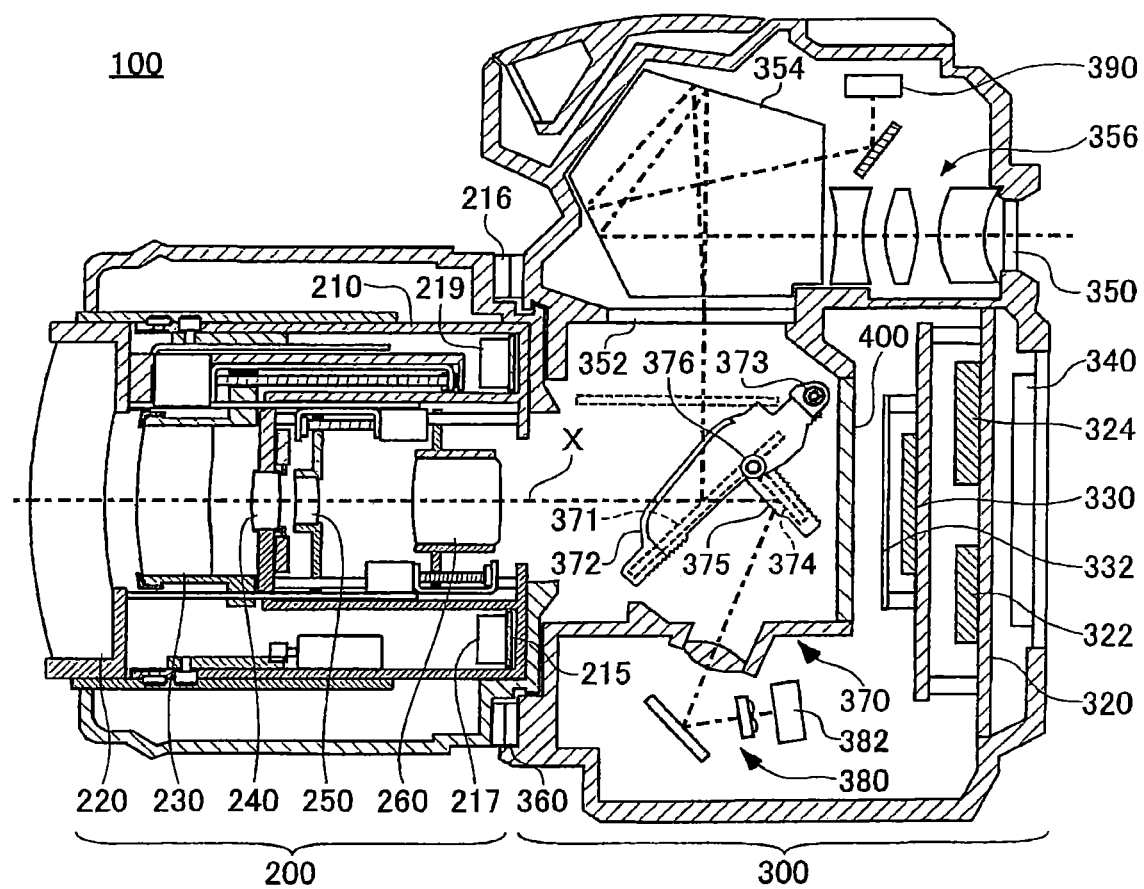
FIG. 1 is a schematic cross-sectional view of an image capturing apparatus 100 in a contracted state.
Figure 2:
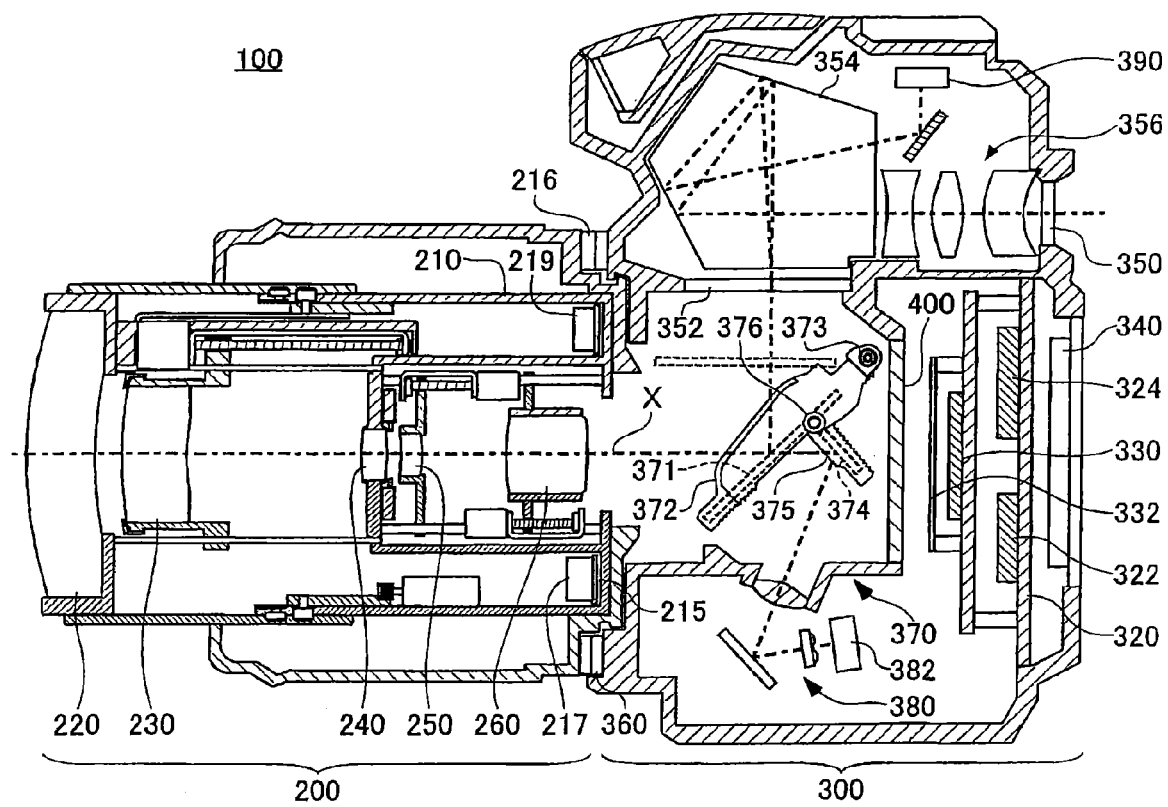
FIG. 2 is a schematic cross-sectional view of the image capturing apparatus 100 in an extended state.

FIGS. 1 and 2 are schematic cross-sectional views of an image capturing apparatus 100. FIG. 1 shows a contracted state in which a lens unit 200 is contracted, and FIG. 2 shows an extended state in which the lens unit 200 is extended. In FIGS. 1 and 2, identical elements are given the same reference numerals, and redundant descriptions are omitted.

The image capturing apparatus 100 includes the lens unit 200 and a camera body 300. The lens unit 200 includes a fixed cylinder 210, a plurality of lenses 220, 230, 240, 250, and 260, a lens-side mounting section 216, an actuator driving section 217, and a lens barrel CPU 219. One end of the fixed cylinder 210 is connected to the body-side mounting section 360 of the camera body 300 via the lens-side mounting section 216.

The connection between the lens-side mounting section 216 and the body-side mounting section 360 can be released by a predetermined operation. As a result, another lens unit 200 having a lens-side mounting section 216 compliant with the same standards can be mounted on the camera body 300.

The actuator driving section 217 and the lens barrel CPU 219 are mounted on an annular substrate 215 arranged on the inside of the rear surface of the lens unit 200. The actuator driving section 217 supplies drive power to a plurality of actuators of the lens unit 200, according to instructions received from the lens barrel CPU 219. The actuators are described in reference to another drawing.

The lens barrel CPU 219 controls the actuator driving section 217 and the like in the lens unit 200, and also communicates with the camera body 300. As a result, the lens unit 200 mounted in the camera body 300 operates together with the camera body 300.

In the lens unit 200, the lenses 220, 230, 240, 250, and 260 are arranged on an optical axis X to form an optical system. It should be noted that, in the contracted state shown in FIG. 1, the length of the lens unit 200 in the optical axis X direction is contracted.

In the lens unit 200 in the contracted state, all of the lenses 220, 230, 240, 250, and 260 are near each other. Accordingly, the lens unit 200 is short in the optical axis X direction.

In contrast, the lens unit 200 in the extended state shown in FIG. 2 is long in the optical axis X direction, particularly because the interval between the lenses 230 and 240 is increased. By moving the one lens 230 in the optical axis X direction while in this state, the optical system formed by the lenses 220, 230, 240, 250, and 260 forms a subject image on an image capturing surface of the image capturing element 330 within the camera body 300. Furthermore, by moving the three lenses 230, 250, and 260 in the optical axis X direction, the optical system changes the magnification of the formed image.

The camera body 300 includes a mirror unit 370 arranged on the back of the body-side mounting section 360 relative to the lens unit 200. A focusing optical system 380 is arranged below the mirror unit 370. A focusing screen 352 is arranged above the mirror unit 370.

A pentaprism 354 is arranged above the focusing screen 352, and a finder optical system 356 is arranged behind the pentaprism 354. The rear end of the finder optical system 356 is exposed in the back of the camera body 300 as a finder 350.

A shutter apparatus 400, a low-pass filter 332, an image capturing element 330, a main substrate 320, and a display section 340 are arranged sequentially behind the mirror unit 370. The display section 340, which is formed by a liquid crystal display board or the like, is shown on the back of the camera body 300. A body CPU 322 and an image processing circuit 324 are mounted on the main substrate 320.

The mirror unit 370 includes a main mirror 371 and a sub-mirror 374. The main mirror 371 is supported by a main mirror holding frame 372 rotatably supported by a main mirror rotating axle 373. The sub-mirror 374 is supported by a sub-mirror holding frame 375 that is supported on a sub-mirror rotating axle 376. The sub-mirror holding frame 375 rotates relative to the main mirror holding frame 372. Accordingly, when the main mirror holding frame 372 rotates, the sub-mirror holding frame 375 moves along with the main mirror holding frame 372.

When the front edge of the main mirror holding frame 372 is lowered, the main mirror 371 is inclined relative to the incident light from the lens unit 200. When the main mirror holding frame 372 is raised, the main mirror 371 is withdrawn from the path of the incident light.

When the main mirror 371 is in the path of the incident light, the incident light passed through the lens unit 200 is reflected by the main mirror 371 and guided to the focusing screen 352. The focusing screen 352 is positioned to be coupled to the optical system of the lens unit 200, and therefore the subject image formed by the optical system is also formed on the focusing screen 352.

The image formed on the focusing screen 352 is observed from the finder 350 via the pentaprism 354 and the finder optical system 356. The light of the subject image passes through the pentaprism 354, and therefore the subject image on the focusing screen 352 is observed as an upright normal image in the finder 350.

The photometric sensor 390 is arranged above the finder optical system 356, and receives a portion of the incident light that is split by the pentaprism 354. The photometric sensor 390 detects the subject brightness, and the body CPU 322 calculates exposure conditions, which are a portion of the image capturing conditions.

The main mirror 371 includes a half mirror region through which passes a portion of the incident light. The sub-mirror 374 reflects the portion of incident light from the half mirror region, toward the focusing optical system 380. The focusing optical system 380 guides the portion of incident light to the focal point sensor 382. In this way, the body CPU 322 determines a target position of the lens 230 when focusing the optical system of the lens unit 200.

In the image capturing apparatus 100 described above, when a release button is pressed lightly, the focal point sensor 382 and the photometric sensor 390 are activated and the image capturing apparatus 100 can capture a subject image with suitable image capturing conditions. Next, when the release button is fully pressed, the main mirror 371 and the sub-mirror 374 move to the withdrawn position and the shutter apparatus 400 opens. In this way, the incident light from the lens unit 200 passes through the low-pass filter 332 to be incident to the image capturing element 330.

For ease of explanation, in the following description, the side of the image capturing apparatus 100 on which the lens unit 200 is arranged is referred to as the "front" and the side on which the display section 340 and the finder 350 are arranged is referred to as the "rear" or the "back." When referring to internal structures in the lens unit 200 or the camera body 300, locations near the back can be described as "deep."

Figure 3:
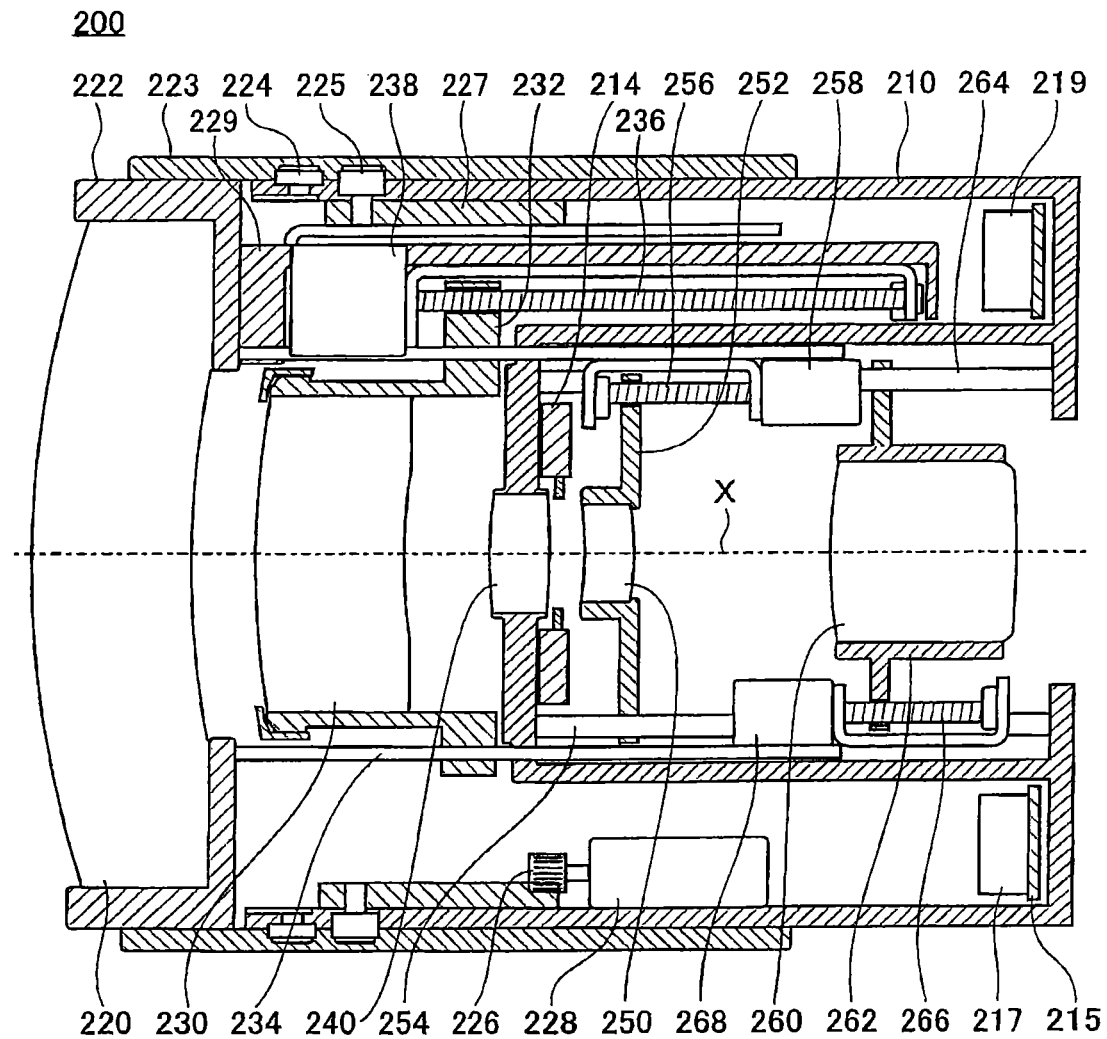
FIG. 3 is a schematic cross-sectional view of the contracted lens unit 200.

FIG. 3 is a schematic cross-sectional view of the contracted lens unit 200. Components that are the same as those in FIGS. 1 and 2 are given the same reference numerals, and redundant descriptions are omitted.

The lens 220 positioned at the tip of the lens unit 200 (on the left side of the drawing) is supported by a lens holding frame 222. The lens holding frame 222 is fixed to the tip of the moving cylinder 223. The moving cylinder 223 has, on the inner surface thereof, a straight groove in the optical axis X direction and a cam grove in a direction orthogonal to the optical axis X direction.

The straight groove engages with a fixed cam pin 224 fixed to the outer surface of the fixed cylinder 210. As a result, the moving cylinder 223 is restricted from rotating on the optical axis X, while being allowed to move back and forth relative to the fixed cylinder 210 along the optical axis X.

The cam groove engages with a rotating cam pin 225. The rotating cam pin 225 is affixed to the outer surface of the drive ring 227.

The drive ring 227 is inserted into the fixed cylinder 210, and rotates on the optical axis X along the inner surface of the fixed cylinder 210. When the drive ring 227 rotates on the optical axis X, the rotating cam pin 225 moves in the direction of the perimeter of the fixed cylinder 210, along with the outer surface of the drive ring 227. Accordingly, when the drive ring 227 rotates, the moving cylinder 223 moves in the optical axis X direction according to the drive force communicated from the rotating cam pin 225, thereby extending and contracting the lens unit 200.

Furthermore, the drive ring 227 itself includes teeth, and engages with the pinion gear 226. The pinion gear 226 is rotationally driven by the actuator 228. Accordingly, the lens barrel CPU 219 causes the drive ring 227 to rotate on the optical axis X within the fixed cylinder 210 by instructing the actuator driving section 217 to supply drive power to the actuator 228.

As a result, the lens barrel CPU 219 moves the moving cylinder 223 back and forth to contract or extend the lens unit 200. A DC motor with large output torque is preferably used as the actuator 228 that causes the lens 220 to move back and forth with the moving cylinder 223.

The lens 230 arranged adjacent to the lens 220 is supported by a lens holding frame 232. The lens holding frame 232 engages with a pair of guide bars 234 arranged parallel to the optical axis X, to be supported while allowing for movement in the optical axis X direction.

The lens holding frame 232 (shown at the top of the drawing) is screwed onto the lead screw 236 arranged parallel to the optical axis X. The lead screw 236 engages with the actuator 238, and rotates together with the drive axle of the actuator 238 when the actuator 238 rotates.

Accordingly, the lens barrel CPU 219 moves the lens holding frame 232 in the optical axis X direction by instructing the actuator driving section 217 to supply drive power to the actuator 238. A stepping motor, supersonic motor, or voice coil motor, for example, that operates quietly and can accurately control the movement amount is preferably used as the actuator 258.

The front end of the guide bar 234 supports the lens holding frame 232, and is engaged with the lens holding frame 222 of the lens 220. The guide bar 234 is supported to be slideable relative to the fixed cylinder 210. The lead screw 236 and the actuator 238 are also engaged with the lens holding frame 222 via the engaging member 229. Accordingly, when the actuator 228 operates and the lens holding frame 222 moves together with the moving cylinder 223 in the optical axis X direction, the lens 230, the lens holding frame 232, the guide bar 234, the lead screw 236, and the actuator 238 also move together.

The lens 240 arranged adjacent to the lens 230 is directly supported by the fixed cylinder 210. Accordingly, the lens 240 does not move within the lens unit 200. A diaphragm apparatus 214 is also fixed to the fixed cylinder 210 adjacent to the lens 240.

In the lens unit 200, the lens 240 supported directly by the fixed cylinder 210 may serve as a stabilizing lens. The stabilizing lens moves in a direction orthogonal to the optical axis X, and compensates for shaking of the hand that occurs when the lens unit 200 is moved in a direction orthogonal to the optical axis X.

The lens 250 arranged next to the lens 240 is held by a lens holding frame 252. One end of the lens holding frame 252 (the bottom end in the example shown in the drawing) engages with the guide bar 254 arranged parallel to the optical axis X, and is supported to be movable in the optical axis X direction.

The other end of the lens holding frame 252 (the top end in the example shown in the drawing) screws onto the lead screw 256 arranged parallel to the optical axis X. The lead screw 256 engages with the actuator 258, and rotates together with the drive axle of the actuator 258 when the actuator 258 rotates. Accordingly, the lens barrel CPU 219 can move the lens 250 in the optical axis X direction by instructing the actuator driving section 217 to supply drive power to the actuator 258.

The lens 260 arranged at the rear end of the lens unit 200 is supported by the lens holding frame 262. One end of the lens holding frame 262 (the top end in the example of the drawing) engages with the guide bar 264 arranged parallel to the optical axis X, and is supported to be moveable in the optical axis X direction.

The other end of the lens holding frame 262 screws into the lead screw 266 arranged parallel to the optical axis X. The lead screw 266 engages with the actuator 268, and rotates together with the drive axle of the actuator 268 when the actuator 268 rotates.

Accordingly, the lens barrel CPU 219 can move the lens 260 in the optical axis X direction by instructing the actuator driving section 217 to supply drive power to the actuator 268. A stepping motor, supersonic motor, or voice coil motor, for example, that operates quietly and can accurately control the movement amount is preferably used as the actuator 258 and the actuator 268.

Figure 4:
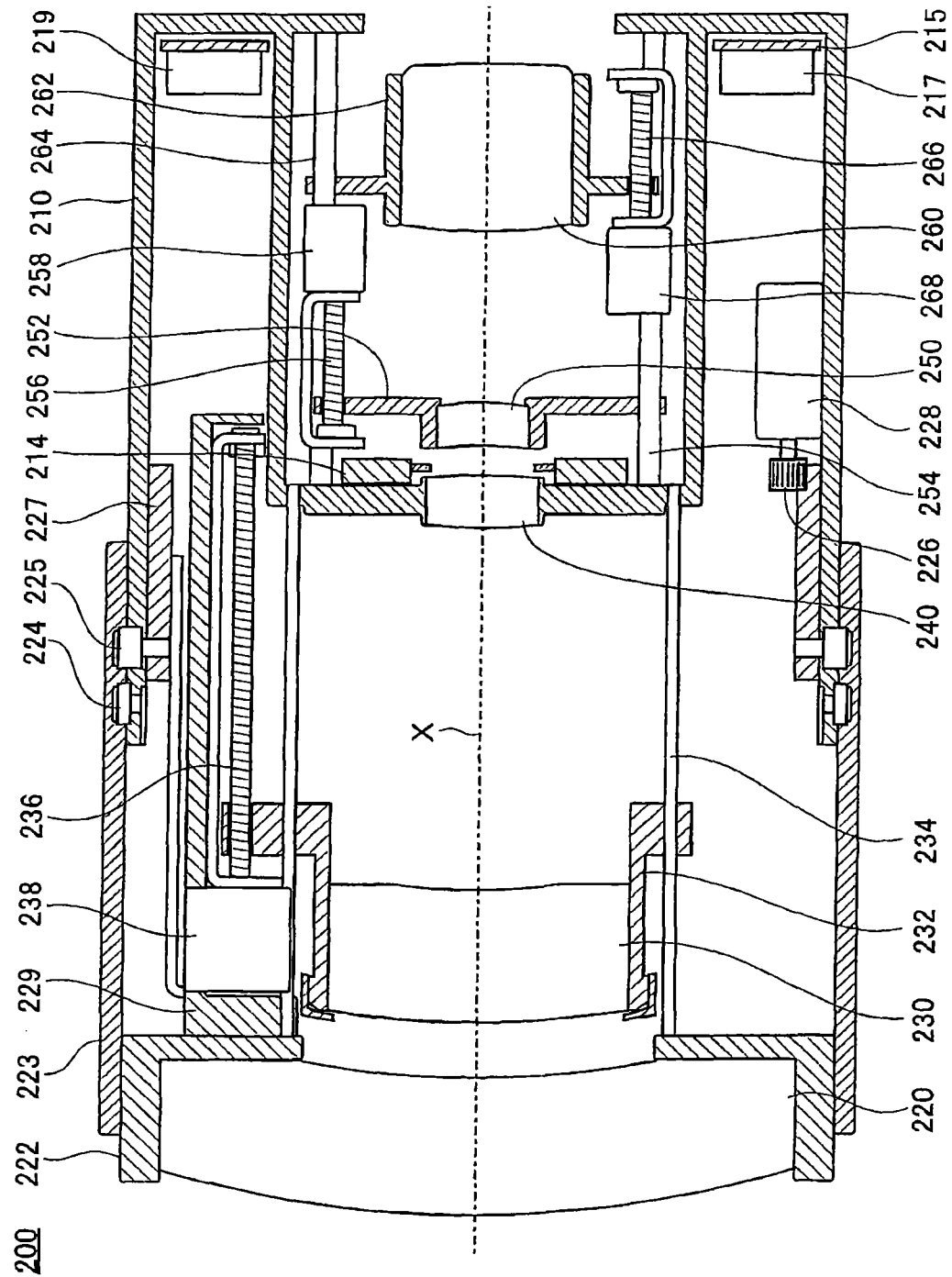
FIG. 4 is a schematic cross-sectional view of the extended lens unit 200.

FIG. 4 is a schematic cross-sectional view of the extended lens unit 200. By operating the actuator 228 to move the moving cylinder 223 forward, the lens unit 200 reaches the extended state shown in FIG. 4.

Specifically, when the moving cylinder 223 is moved forward to put the lens unit 200 in the extended state, the lens holding frame 222 fixed to the front end of the moving cylinder 223 and the lens 220 held by the lens holding frame 222 move forward. Furthermore, the guide bar 234 and the engaging member 229 whose front end is engaged with the lens holding frame 222 move forward together with the lens holding frame 222.

The engaging member 229 holds the lead screw 236 and the actuator 238. Accordingly, when the engaging member 229 and the guide bar 234 move forward, the lens 230 and the lens holding frame 232 also move forward together with the lens 220 and the lens holding frame 232.

As a result, inside the fixed cylinder 210, an empty cylinder is formed at the front of the actuator driving section 217 and the lens barrel CPU 219. The guide bar 234 is pulled out from the fixed cylinder 210 by the lens holding frame 222, thereby significantly moving the lens holding frame 232 along the guide bar 234 between the lenses 220 and 240.

Accordingly, by operating one actuator 238 while the lens unit 200 is in the extended state to move the lens 230, the optical system of the lens unit 200 can change the focal position. Furthermore, by operating the actuators 238, 258, and 268 with the lens unit 200 in the extended state, the magnification of the optical system of the lens unit 200 can be changed.

Figure 5:
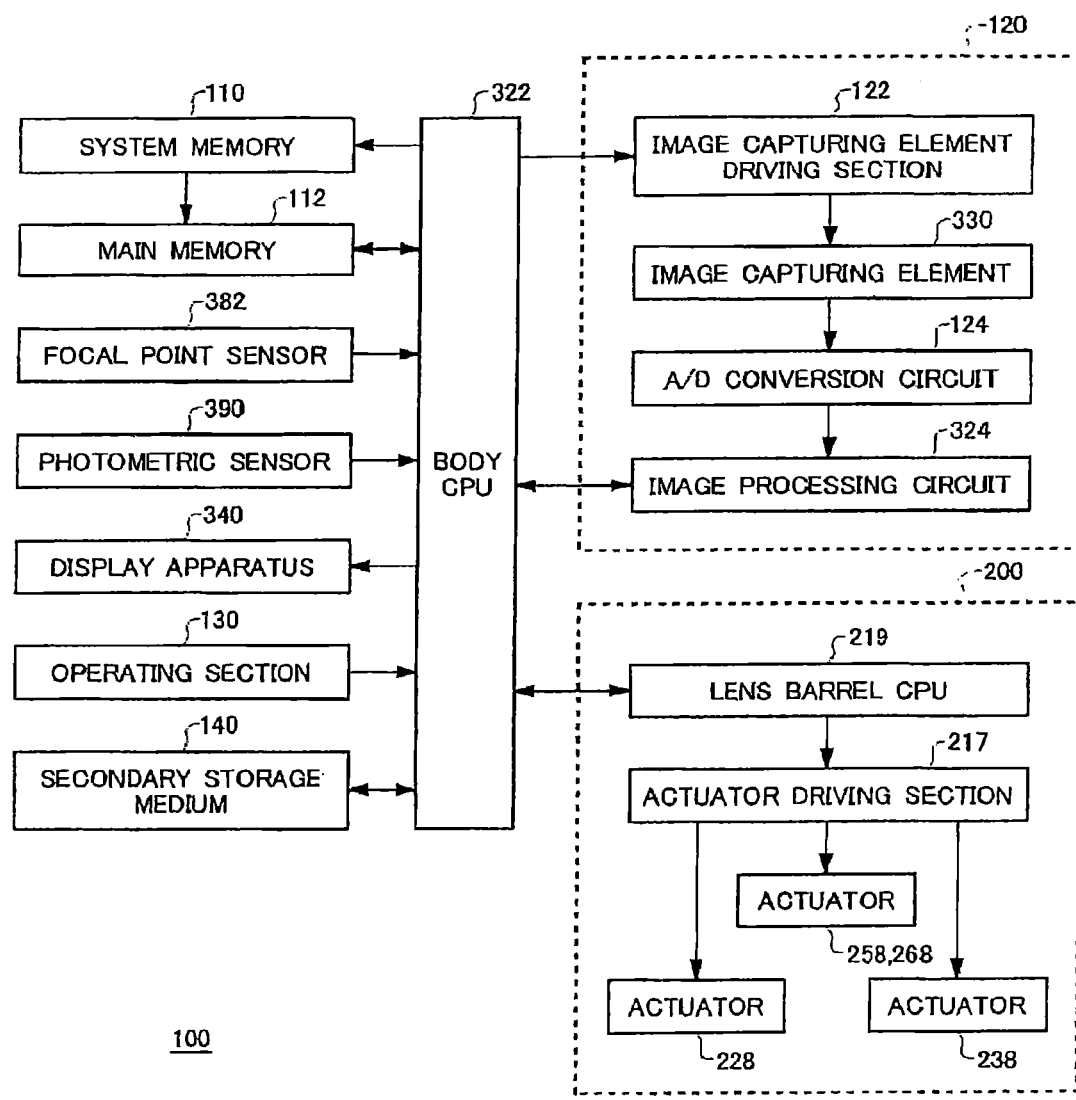
FIG. 5 is a block diagram of the image capturing apparatus 100.

FIG. 5 is a block diagram of the image capturing apparatus 100 including the lens unit 200 and the camera body 300. The image capturing apparatus 100 is formed by a body CPU 322 and components connected directly or indirectly to the body CPU 322.

A system memory 110 and a main memory 112 are connected to the body CPU 322. The system memory 110 includes at least one of a non-volatile recording medium and a read-only recording medium, and holds a firmware program executed by the body CPU 322, for example, even when power is not supplied. The main memory 112 includes a RAM, and is used as the operating region of the body CPU 322.

An image capturing section 120 is connected to the body CPU 322. The image capturing section 120 includes an image capturing element driving section 122, an image capturing element 330, an analog-digital conversion circuit 124, and an image processing circuit 324. The image capturing element 330 is driven by the image capturing element driving section 122 at a specified timing, to photoelectrically convert the subject image and output an image signal.

The image signal output from the image capturing element 330 is digitized by the analog-digital conversion circuit 124 and converted into image data by the image processing circuit 324. The image processing circuit 324 adjusts the white balance, the sharpness, the gamma, the gray level, and the compression of the image, for example, when generating the image data.

The image data generated by the image processing circuit 324 is stored and saved in the secondary storage medium 140. A medium including a non-volatile recording element such as a flash memory card is used as the secondary storage medium 140. At least a portion of the secondary storage medium 140 can be detached from the camera body 300 and replaced.

The lens barrel CPU 219, a focal point sensor 382, and a photometric sensor 390 are connected to the body CPU 322. The focal point sensor 382 detects the focal position based on the subject image formed by the optical system of the lens unit 200, and instructs the lens barrel CPU 219 to focus the incident light on the image capturing element 330. The photometric sensor 390 receives a portion of the incident light, detects the subject brightness, and calculates a suitable diaphragm opening and shutter speed, for example.

When the lens unit 200 is mounted on the camera body 300, the body CPU 322 supplies instructions to the lens barrel CPU 219. The lens barrel CPU 219 receives the instructions from the body CPU 322 and operates the actuators 228, 238, 258, and 268 by supplying drive current from the actuator driving section 217. As a result, the lens unit 200 performs one of extension, magnification, focusing, and contraction under the control of the body CPU 322.

An operating section 130 and a display section 340 are connected to the body CPU 322. The operating section 130 forms an interface into which instructions are input by receiving user operations, and may include a power switch, a release switch, an arrow key, and a dial bar, for example. The display section 340 displays the captured image, and may also display an image of the subject formed through the lens unit 200 in a live view mode or a preview mode, for example. The display section 340 may also display setting values or the like input by the user.

Figure 6:
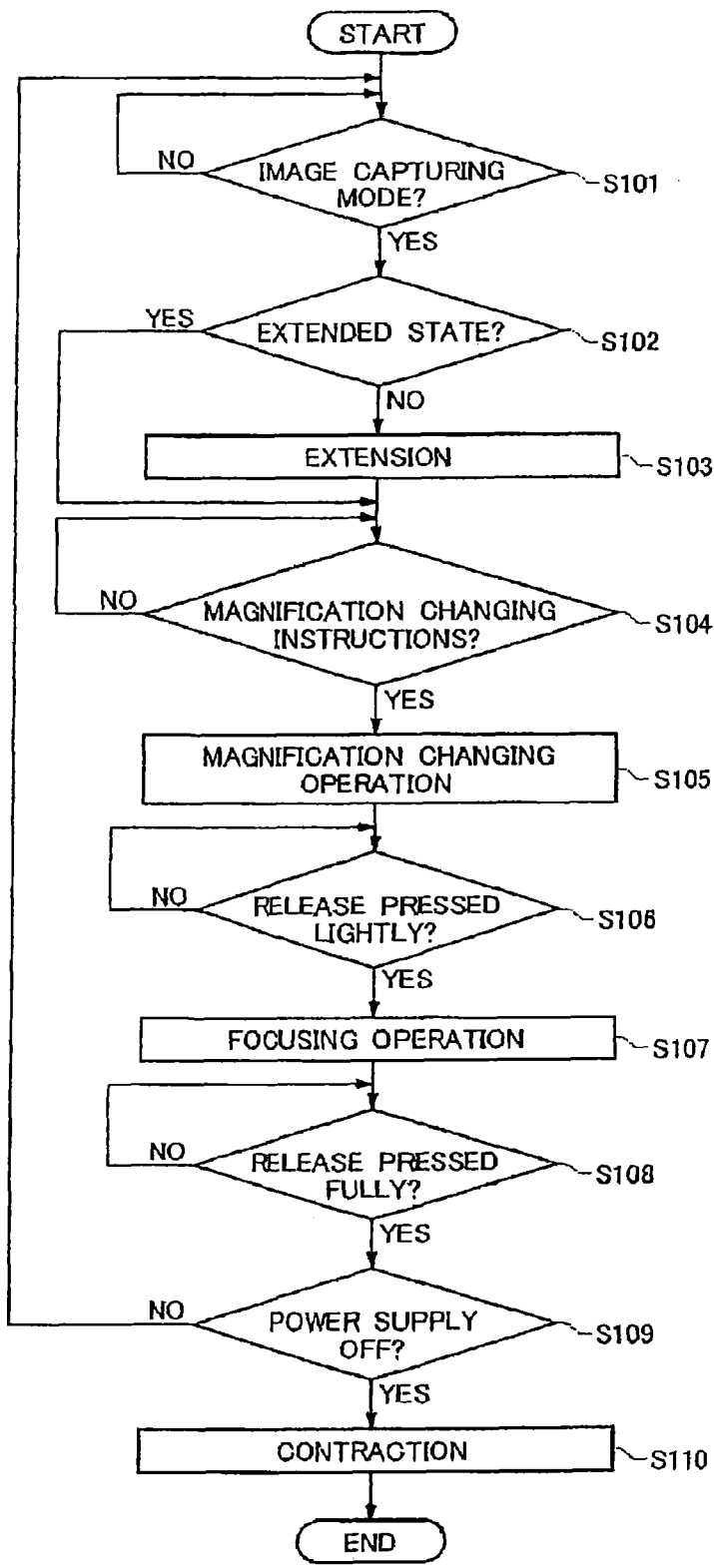
FIG. 6 is a flow chart showing the control process of the body CPU 322.

FIG. 6 is a flow chart showing the control process of the body CPU 322 for the actuators 228, 238, 258, and 268 of the lens unit 200. When the power of the image capturing apparatus 100 is turned on, the body CPU 322 detects whether the operating mode set by the camera body 300 is an image capturing mode (step S101), and if the image capturing mode is not set (the NO of step S101), enters a standby state with respect to controlling the lens unit 200.

On the other hand, if the image capturing mode is already set by the camera body 300 or if the image capturing mode is switched to (the YES of step S101), the body CPU 322 asks the lens barrel CPU 219 whether the lens unit 200 is in the extended state (step S102), and if the lens unit 200 is not in the extended state (the NO of step S102), instructs the lens barrel CPU 219 to extend the lens unit 200 (step S103).

When instructions for extension are received from the body CPU 322, the lens barrel CPU 219 instructs the actuator driving section 217 to supply drive current to the actuator 228. As a result, the moving cylinder 223 is moved out and the lens unit 200 is extended. Furthermore, along with the movement of the moving cylinder 223, the lens 230, the lens holding frame 232, the guide bar 234, the lead screw 236, the actuator 238, and the engaging member 229 move forward together with lens holding frame 222.

When the lens unit 200 extends, the body CPU 322 observes whether there are instructions for the image capturing apparatus 100 to change the magnification of the lens unit 200 (step S104), and waits until instructions for changing the magnification are received (the NO of step S104). When instructions for changing the magnification are detected (the YES of step S104), the body CPU 322 instructs the lens barrel CPU 219 to perform the operation to change the magnification (step S105).

When instructions for the magnification changing operation are received, the lens barrel CPU 219 instructs the actuator driving section 217 to supply drive current to the actuators 238, 258, and 268. As a result, the lenses 230, 250, and 260 move relative to each other thereby changing the magnification of the optical system of the lens unit 200.

While the operation for changing the magnification is being performed, drive current is not supplied to the actuator 228, and therefore the moving cylinder 223 and the lens 220 do not move. When the lens unit 200 performs the magnification changing operation, the total length of the lens unit 200 does not change. Furthermore, since the actuator 228 is not operated, the lens unit 200 generates only a small amount of operating noise.

Next, the body CPU 322 observes whether the release button of the image capturing apparatus 100 is pressed lightly (step S106), and waits until the lightly-pressed state is detected (the NO of step S106). When the release button is detected to be in the lightly-pressed state (the YES of step S106), the body CPU 322 acquires from the focal point sensor 382 the amount of movement of the lens 230 necessary to focus the optical system of the lens unit 200, and transmits this movement amount to the lens barrel CPU 219 along with instructions for performing the focusing operation (step S107).

When instructions for the focusing operation are received, the lens barrel CPU 219 instructs the actuator driving section 217 to supply drive current to the actuator 238. As a result, the lens 230 moves to focus the optical system of the lens unit 200.

While the focusing operation is being performed, drive current is not supplied to the actuators 228, 258, and 268, and therefore the moving cylinder 223 and the lenses 250 and 260 do not move. Accordingly, when the lens unit 200 performs the focusing operation, the total length of the lens unit 200 does not change. Furthermore, since the actuator 228 is not operated, the lens unit 200 generates only a small amount of operating noise.

Next, the body CPU 322 observes whether the release button of the image capturing apparatus 100 is pressed fully (step S108), and waits until the there are shutter release instructions (the NO of step S108). When the release button is detected to be in the fully-pressed state (the YES of step S108), the body CPU 322 maintains the focus state of the lens unit 200 until image capturing is completed.

Next, when the image capturing by the camera body 300 is finished, the body CPU 322 detects whether the power supply of the image capturing apparatus 100 is turned OFF (step S109). If the power supply of the image capturing apparatus 100 has already been turned ON (the NO of step S109), the body CPU 322 again detects whether the image capturing apparatus 100 is in the image capturing mode (step S101). After this, the control process described above is repeated again.

At step S209, if the power supply of the image capturing apparatus 100 is detected as being OFF (the YES of S109), the body CPU 322 instructs the lens barrel CPU 219 to contract the lens unit 200. When instructions for contraction are received, the lens barrel CPU 219 instructs the actuator driving section 217 to supply drive current to the actuator 228.

As a result, the moving cylinder 223 is pulled and the lens unit 200 is contracted (step S110). Furthermore, along with the backward movement of the moving cylinder 223, the lens 230, the lens holding frame 232, the guide bar 234, the lead screw 236, the actuator 238, and the engaging member 229 also move backward together with the lens holding frame 222.

As a result, the back end regions of the lead screw 236 and the engaging member 229 enter into the space formed when the lens barrel CPU 219 moved forward. Furthermore, the back end of the guide bar 234 enters into the fixed cylinder 210. Accordingly, the overall length of the lens unit 200 is significantly reduced. At this point, the control process of the body CPU 322 by the lens unit 200 is completed.

FIG. 7 is a chart showing the operating states of the actuators 228, 238, 258 and 268 in the lens unit 200 for the above series of controls. As shown in FIG. 7, the actuator 228 having large drive force and loud operating noise operates during extension and contraction of the lens unit 200, which is a period during which the camera body 300 is not capturing an image.

On the other hand, the magnification changing and focusing that are performed while the camera body 300 captures an image are performed using the actuators 238, 258, and 268 with little operating noise. Accordingly, even when sound recording is performed at the same time as image capturing, such as when capturing a moving image, the operating noise of the actuator 228 is not recorded.

During the image capturing operation, the actuators 238, 258, and 268 each operate with one unit including one of the lenses 230, 250, and 260 and one of the lens holding frames 232, 252, and 262 as a load, and therefore the actuators 238, 258, and 268 can be made small to suit the load. Accordingly, the operating noise of the actuators 238, 258, and 268 may be further restricted.

The control process shown in FIG. 6 can be performed when capturing a moving image or when capturing a still image. However, when capturing a moving image, one possible image capturing technique includes changing magnification of the lens unit 200 while continuing the image capturing. Accordingly, when capturing a moving image, the body CPU 322 might execute a different control process than shown in FIG. 6.

However, even such a case, the actuator 228 that generates high output torque in exchange for having loud operating noise is used neither when changing magnification nor when focusing, and therefore the operating noise of the actuator 228 is not included in the captured moving image.

Figure 8:
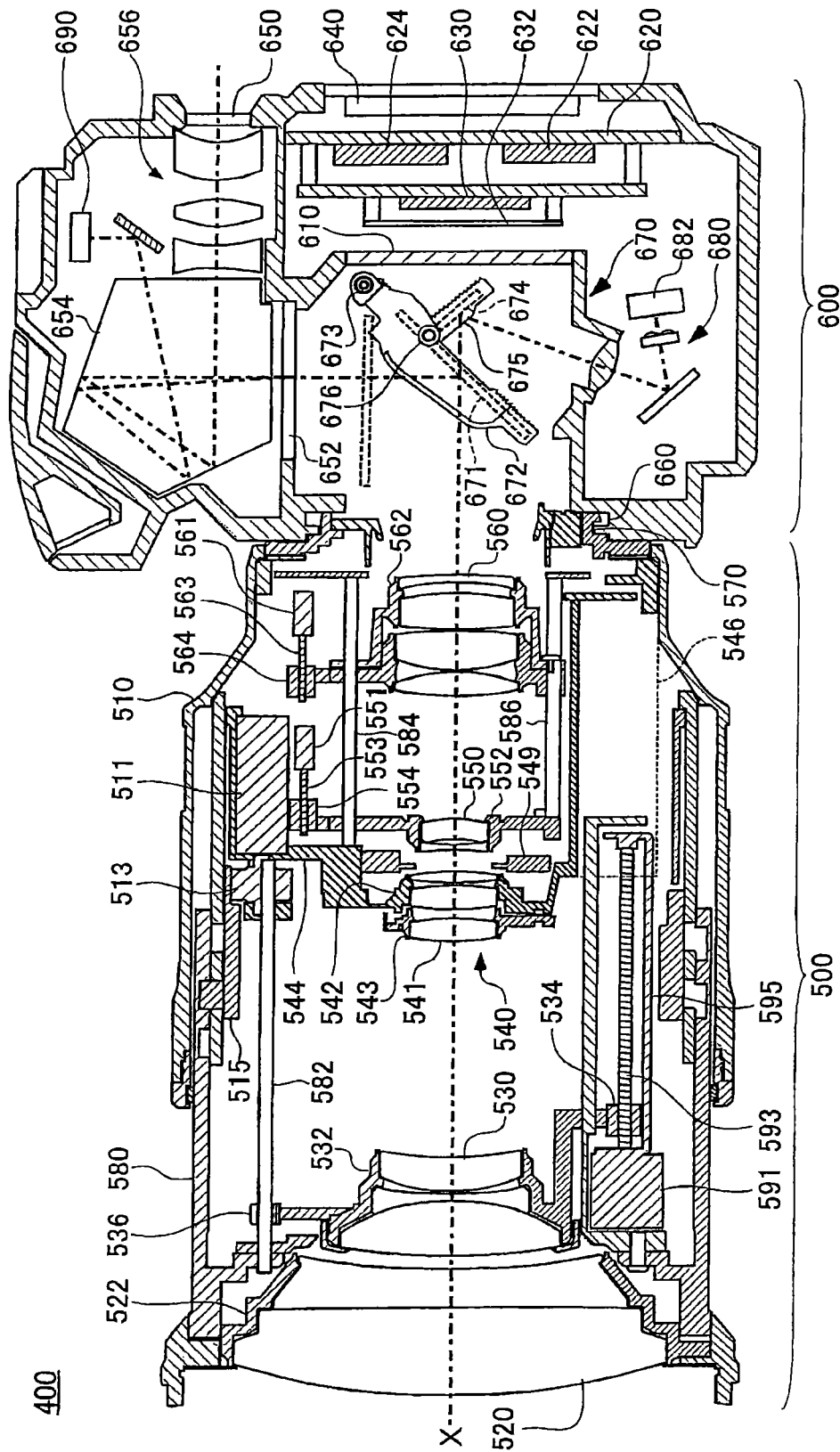
FIG. 8 is a schematic cross-sectional view of the image capturing apparatus 400.

FIG. 8 is a schematic cross-sectional view of a lens unit 500. The image capturing apparatus 400 includes the lens unit 500 and a camera body 600. In FIG. 8, the lens unit 500 attached to the image capturing apparatus 400 is in an extended state in which the overall length is increased.

For ease of explanation, in the following description, the subject side relative to the lens unit 500 attached to the camera body 600 is referred to as the "front" or "tip" of the image capturing apparatus 400. Furthermore, the side of the lens unit 500 that is not on the subject side is referred to as the "rear" or "back" of the image capturing apparatus 400.

The lens unit 500 includes a fixed cylinder 510, a plurality of lens groups from a first lens group 520 to a fifth lens group 560, a plurality of actuators 511, 551, 561, and 591, and a moving cylinder 580. The lens unit 500 is connected to a body-side mounting section 660 of the camera body 600 by a lens-side mounting section 570 disposed at the rear of the fixed cylinder 510. In this way, the fixed cylinder 510 is fixed to the camera body 600.

The connection between the lens-side mounting section 570 and the body-side mounting section 660 can be released by a predetermined operation. In this way, other lens units 500 having lens-side mounting sections 570 with the same standards can be attached to the camera body 600.

In the lens unit 500, the moving cylinder 580 is supported by the fixed cylinder 510 to be movable in a front and back direction, i.e. a direction parallel to the optical axis X. The movement of the moving cylinder 580 causes the overall length of the lens unit 500 to change. When the lens unit 500 is in the extended state, the moving cylinder 580 moves forward relative to the fixed cylinder 510 to increase the overall length of the lens unit 500. As a result, the first lens group 520 to the fifth lens group 560 are arranged at predetermined intervals along the optical axis X to form an optical system.

The first lens group 520 is held by a first holding frame 522 and is fixed to the front end of the moving cylinder 580. Accordingly, when the moving cylinder 580 moves, the first lens group 520 moves in a direction of the optical axis X together with the moving cylinder 580. The inside the moving cylinder 580 is hollow, and light incident to the first lens group 520 when the lens unit 500 is in the extended state passes through the moving cylinder 580 to reach the second lens group 530.

When the optical system performs focusing or magnification while the lens unit 500 is in the extended state, the first lens group 520 does not move. The first lens group 520 and the moving cylinder 580 move when the lens unit 500 changes between the extended state and the contracted state.

The second lens group 530 is held by a second holding frame 532, separately from the first lens group 520. The second holding frame 532 engages with a guide axle 582 via an engaging portion 536, and is supported to be moveable along the guide axle 582. The second holding frame 532 is engaged with a threaded component 534 interlocking with a lead screw 593.

The front end of the guide axle 582 is fixed to the moving cylinder 580. Accordingly, when the moving cylinder 580 moves in the direction of the optical axis X, the guide axle 582 also moves in the direction of the optical axis X. In this case, the second lens group 530 and the second holding frame 532 supported by the guide axle 582 also move together.

With the lens unit 500 in the extended state in which the moving cylinder 580 has moved forward, when the actuator 591 rotationally drives the lead screw, the second holding frame 532 moves in a direction parallel to the optical axis X while holding the second lens group 530. The second lens group 530 moves when the optical system of the lens unit 500 performs magnification or focusing. The actuator 591 and the lead screw 593 are supported by the bracket 595.

The third lens group 540 is supported by the third holding frame 542. The third holding frame 542 is supported by the engaging cylinder 544. The engaging cylinder 544 is fixed to the fixed cylinder 510. Accordingly, the third lens group 540 moves relative to the fixed cylinder 510 neither when the lens unit 500 changes between the extended state and the contracted state nor when the lens unit 500 performs magnification or focusing.

The engaging cylinder 544 supports a diaphragm apparatus 549 and the movable holding frame 543 holding the vibration-proof lens 541. The vibration-proof lens 541 moves in a direction orthogonal to the optical axis X, and compensates for blur caused by camera shake or the like. Furthermore, a portion of the engaging cylinder 544 toward the bottom in FIG. 8 has a decreased outer diameter, in order to form a housing portion 546. The housing portion 546 is positioned to the rear of the actuator 591 and the lead screw 593.

The fourth lens group 550 and the fifth lens group 560 are respectively supported by the fourth holding frame 552 and the fifth holding frame 562. The fourth holding frame 552 and the fifth holding frame 562 engage respectively with a pair of guide axles 584 and 586, and respectively interlock with lead screws 553 and 563 via the threaded components 554 and 564.

As a result, when the actuators 551 and 561 rotationally drive the lead screws 553 and 563, the fourth lens group 550 and the fifth lens group 560 move in the direction of the optical axis X. The fourth lens group 550 and the fifth lens group 560 move when the lens unit 500 performs magnification or focusing.

The camera body 600 includes a mirror unit 670 arranged behind the body-side mounting section 660. A focusing optical system 680 is arranged below the mirror unit 670. A focusing screen 652 is arranged above the mirror unit 670.

A pentaprism 654 is arranged further above the focusing screen 652, and a finder optical system 656 is arranged behind the pentaprism 654. The rear end of the finder optical system 656 is exposed at the back surface of the camera body 600 to serve as the finder 650.

A shutter unit 610, low-pass filter 632, image capturing element 630, substrate 620, and display section 640 are sequentially arranged behind the mirror unit 670 in the stated order. The display section 640 formed by a liquid crystal display board, for example, is shown on the back surface of the camera body 600. A control section 622 and an image processing section 624, for example, are implemented on the substrate 620.

The mirror unit 670 includes a main mirror 671 and a sub-mirror 674. The main mirror 671 is supported by a main mirror holding frame 672, which is axially supported by the main mirror rotating axle 673.

The sub-mirror 674 is supported by a sub-mirror holding frame 675, which is axially supported by the sub-mirror rotating axle 676. The sub-mirror holding frame 675 rotates relative to the main mirror holding frame 672. Accordingly, when the main mirror holding frame 672 rotates, the sub-mirror holding frame 675 is displaced along with the main mirror holding frame 672.

When the front end of the main mirror holding frame 672 is lowered, the main mirror 671 is positioned in an inclined state in the path of the incident light from the lens unit 500. When the main mirror holding frame 672 is raised, the main mirror 671 is withdrawn to a position to avoid the incident light.

When the main mirror 671 is positioned in the path of the incident light, the incident light passed through the lens unit 500 is reflected by the main mirror 671 and guided to the focusing screen 652. The focusing screen 652 is arranged at a position conjugate to the optical system of the lens unit 500, and causes the image formed by the optical system of the lens unit 500 to be visible.

The image on the focusing screen 652 is viewed from the finder 650, after passing through the pentaprism 654 and the finder optical system 656. By viewing the image through the pentaprism 654, an upright stereoscopic image can be seen in finder 650.

The photometric sensor 690 is arranged above the finder optical system 656 and receives a portion of the split incident light. The photometric sensor 690 detects brightness of the subject and causes the control section 622 to calculate exposure conditions, which are a portion of the image capturing conditions.

The main mirror 671 includes a half mirror region that passes a portion of the incident light. The sub-mirror 674 reflects a portion of the incident light from the half mirror region toward the focusing optical system 680. The focusing optical system 680 guides a portion of the incident light to the focal point detection sensor 682. In this way, the control section 622 determines the target position to which the lens moves when the optical system of the lens unit 500 performs focusing.

When the release button on the image capturing apparatus 400 is pressed half way, the focal point detection sensor 682 and the photometric sensor 690 are activated to create a state in which the subject can be captured with suitable image capturing conditions. Next, when the release button is fully pressed, the main mirror 671 and the sub-mirror 674 move to the withdrawn position, and the shutter unit 610 opens. As a result, the incident light from the lens unit 500 passes through the low-pass filter 632 to be incident to the image capturing element 630.

Figure 9:
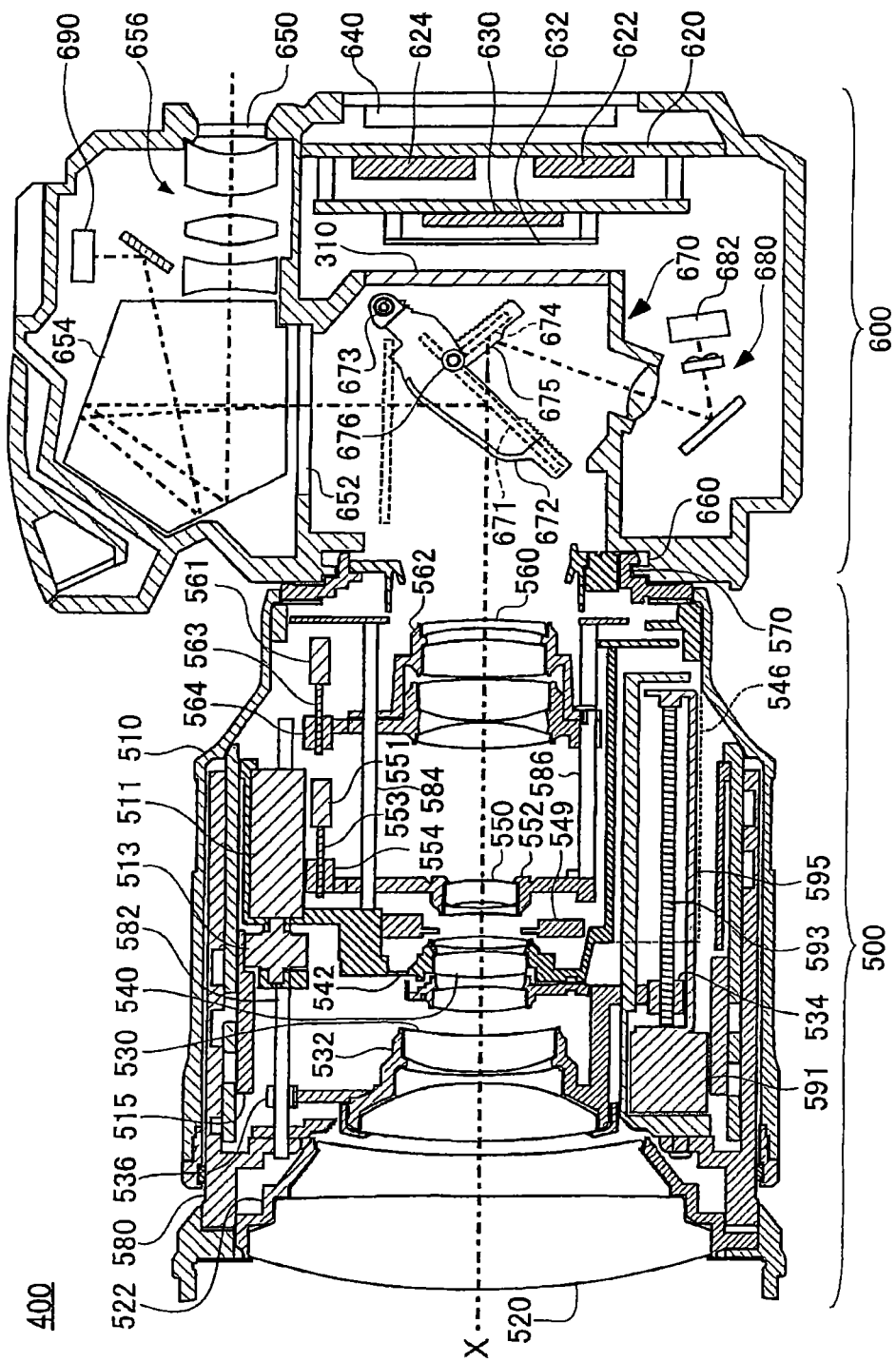
FIG. 9 is a schematic cross-sectional view of the image capturing apparatus 400.

FIG. 9 is a schematic cross-sectional view of the image capturing apparatus 400. In the image capturing apparatus 400 shown in FIG. 9, the lens unit 500 is in the contracted state. In FIG. 9, components that are the same as those in FIG. 8 are given the same reference numerals and redundant descriptions are omitted.

With the lens unit 500 in the contracted state, the moving cylinder 580 is near the camera body 600. As a result, the first lens group 520 held at the front end of the moving cylinder 580 moves backward, to draw near the unmoving third lens group 540. Since the guide axle 582 also moves backward along with the moving cylinder 580, the second lens group 530 supported by the guide axle 582 also moves backward along with the guide axle 582.

Furthermore, the actuator 591, the lead screw 593, and the bracket 595 also move backward together with the moving cylinder 580. Therefore, with the lens unit 500 in the contracted state, the rear end portion of the lead screw 593 enters into the housing portion 546 of the engaging cylinder 544. In other words, as a result of the rear end portion of the lead screw 593 entering into a region on the side of the third lens group 540, the fourth lens group 550, and the fifth lens group 560, the overall length of the lens unit 500 in the contracted state is reduced.

The fourth lens group 550 and the fifth lens group 560 are positioned further towards the rear than the fixed third lens group 540, and therefore need not move when the lens unit 500 changes from the extended state to the contracted state. However, when the lens unit 500 is next extended, in order to quickly transition the lens unit 500 to a usable state, a portion of the operation for contracting the lens unit 500 may include moving the fourth lens group 550 and the fifth lens group 560 to the initial positions thereof.

In this way, with the lens unit 500 in the contracted state, the first lens group 520, the second lens group 530, and the actuator 591 move backward such that the intervals therebetween are decreased, thereby reducing the overall length of the lens unit 500. As a result, the portability of the lens unit 500 is improved.

Figure 10:
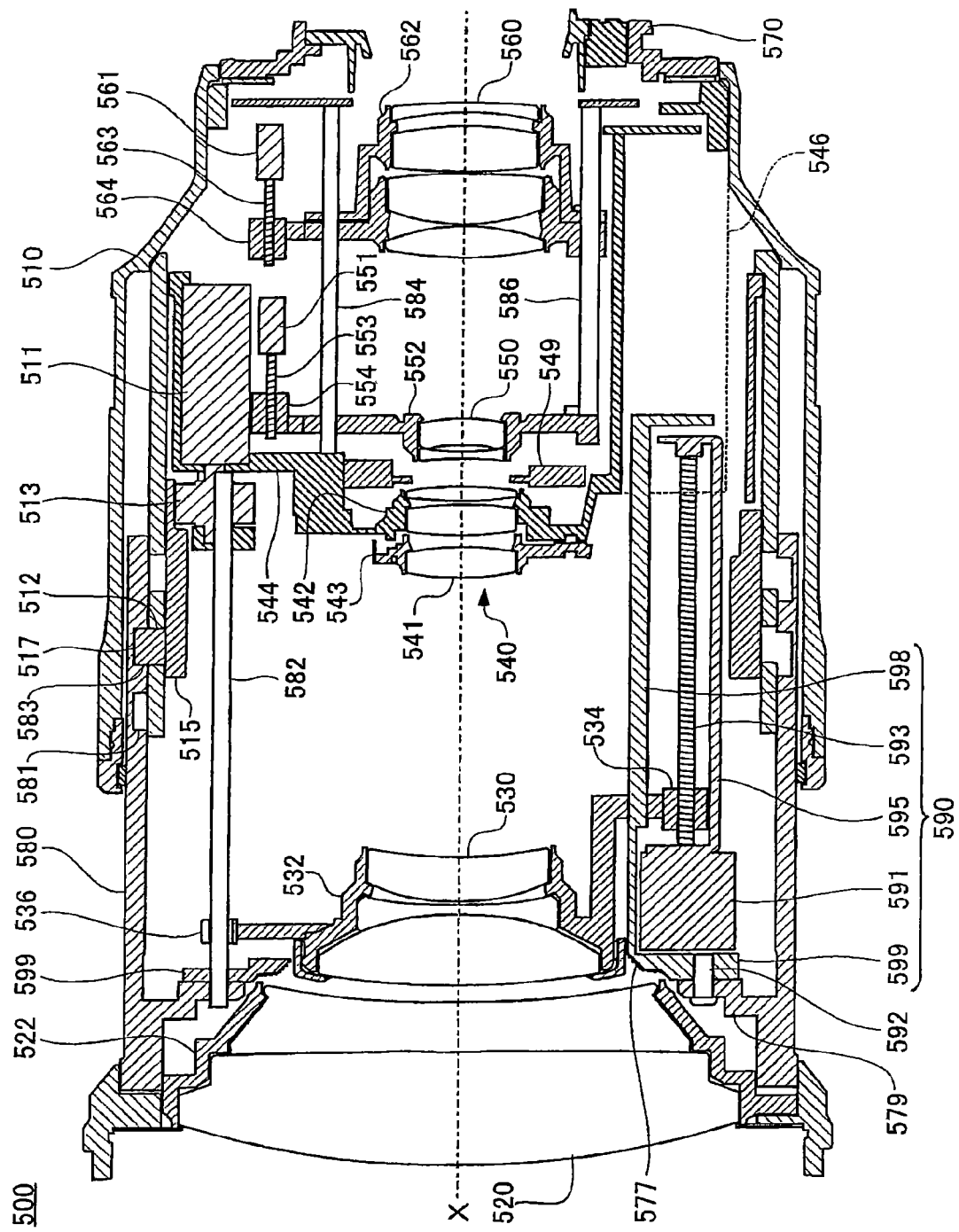
FIG. 10 is a schematic cross-sectional view of the lens unit 500.

FIG. 10 is an enlarged schematic cross-sectional view of the lens unit 500 by itself in the contracted state. Components that are the same as those in FIGS. 8 and 9 are given the same reference numerals, and redundant descriptions are omitted.

In the lens unit 500, the drive ring 515 includes, on the outer circumferential surface thereof, a driving pin 517 protruding outward in the radial direction of the lens unit 500. The driving pin 517 passes through a circumferential groove 512 formed in a portion of the fixed cylinder 510 in the circumferential direction of the lens unit 500, to protrude outside of the engaging cylinder 544. The tip of the driving pin 517 engages with a lead groove 583 formed on the inner surface of the moving cylinder 580.

Figure 11:
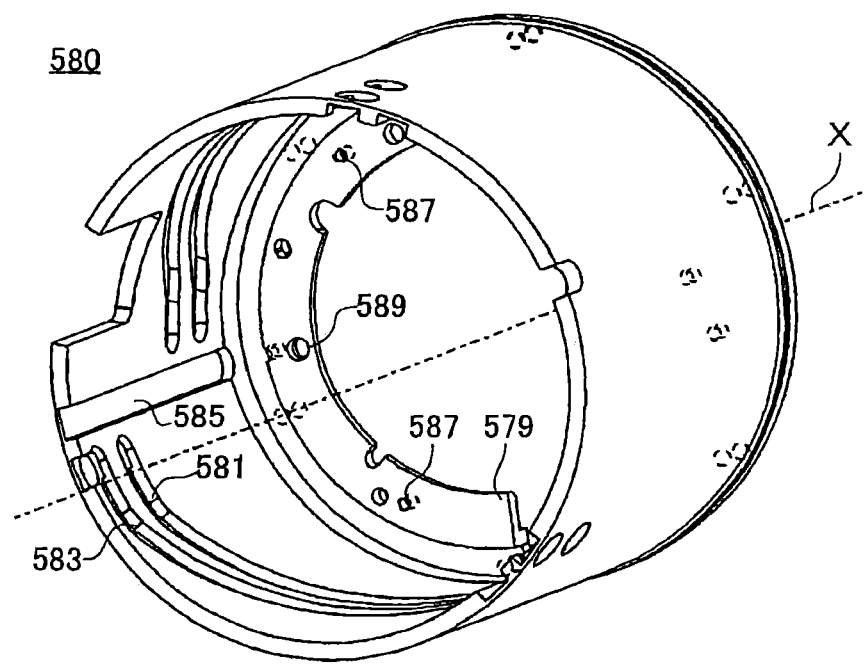
FIG. 11 is a perspective view of the moving cylinder 280.
Figure 12:
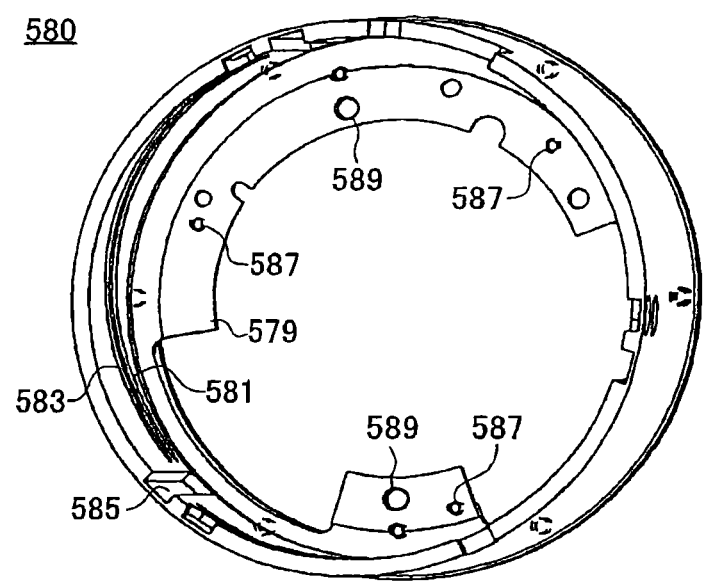
FIG. 12 is a perspective view of the moving cylinder 280.

FIGS. 11 and 12 are each a perspective view of the moving cylinder 580 alone removed from the lens unit 500. FIG. 12 shows the moving cylinder 580 as seen from a different angle than in FIG. 11. Components that are the same as those in FIGS. 8 to 10 are given the same reference numerals, and redundant descriptions are omitted.

The moving cylinder 580 has an overall cylindrical shape, and includes a flange 579 at the front end thereof that protrudes radially inward. The flange 579 leaves an opening that is large enough for incident light to pass through. The flange 579 includes a plurality of screw holes 587 and axle insertion holes 589 formed in a direction parallel to the optical axis X. The front end of the guide axle 582 is inserted into an axle insertion hole 589 to be fixed.

A plurality of lead grooves 581 and 583 and a plurality of linear key grooves 585 are formed in the inner surface of the cylindrical portion of the moving cylinder 580. The lead groove 583 is inclined relative to a direction orthogonal to the optical axis X. The key groove 585 is arranged in a direction parallel to the optical axis X.

The key groove 585 engages with a guide pin protruding from a portion of the engaging cylinder 544 shown in FIG. 10. The guide pin is fixed to the fixed cylinder 510 and engages with the linear key groove 585, thereby regulating the rotation of the moving cylinder 580 on the optical axis X.

Accordingly, when the actuator 511 and the pinion gear 513 rotate, the lead groove 583 and the driving pin 517 rotating together with the drive ring 515 work together to move the moving cylinder 580 in the direction of the optical axis X. As a result, the lens unit 500 changes from the contracted state to the extended state or from the extended state to the contracted state according to the rotational direction of the actuator 511.

A DC motor with large output torque is preferably used as the actuator 511. The DC motor generates operating noise that cannot be ignored during operation, but this is not a problem because the moving cylinder 580 does not move during image capturing.

With the lens unit 500 in the extended state, there is a large gap between the first lens group 520 and the third lens group 540. Accordingly, the second lens group 530 can move a large amount to perform magnification or focusing. The second lens group 530 moves due to the drive force generated by the actuator 591. A stepping motor, for example, that can precisely control the movement amount is preferably used as the actuator 591.

The second lens group 530 includes a lens with a greater diameter and mass than those of the fourth lens group 550 and the fifth lens group 560. Accordingly, the actuator 591 moving the second lens group 530 has a larger output than the actuators 551 and 561 moving the fourth lens group 550 and the fifth lens group 560. Therefore, the vibration caused by the actuator 591 is greater than that of the actuators 551 and 561.

The front end of the lead screw 593 engages with the drive axle of the actuator 591. The rear end of the lead screw 593 is supported by the rear end of the bracket 595. The actuator 591 is supported by the font end of the bracket 595. As a result, the actuator 591, the lead screw 593, and the bracket 595 are formed integrally.

Figure 13:
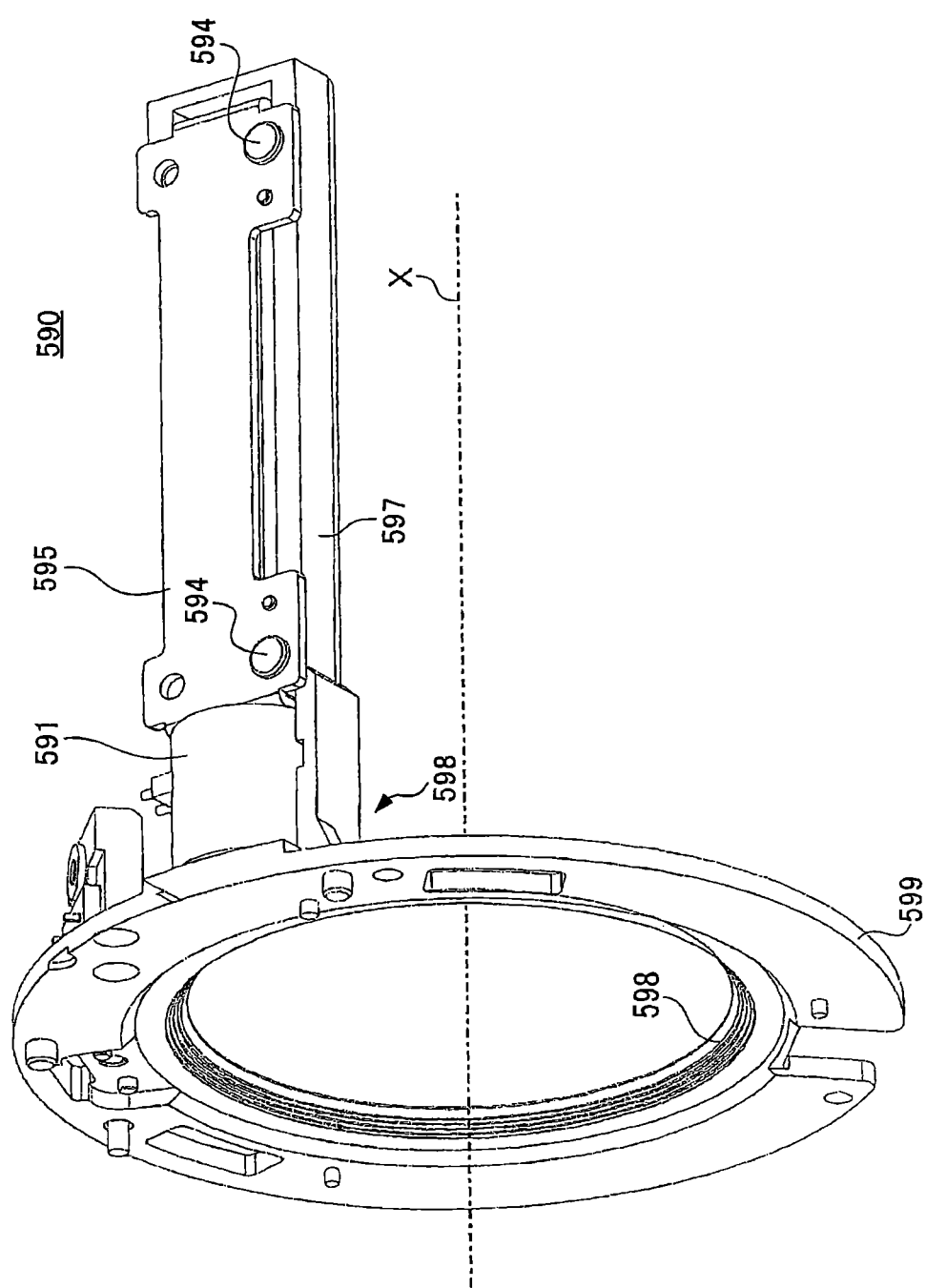
FIG. 13 is a perspective view of the actuator assembly 290.

FIG. 13 is a perspective view of an actuator assembly 590. The actuator assembly 590 includes a case 598 in addition to the actuator 591, the lead screw 593, and the bracket 595 formed integrally.

The bracket 595 is fixed to the case 598 by a stopping screw 594. As a result, the actuator 591 and the lead screw 593 formed integrally on the bracket 595 are supported by the case 598. In this way, the actuator assembly 590 is formed including the actuator 591, the lead screw 593, the bracket 595, and the case 598 formed integrally.

The case 598 includes a shell portion 597 and an annular portion 599. The shell portion 597 includes a cavity for housing the actuator 591, the lead screw 593, and the bracket 595. One end of the shell portion 597 in the longitudinal direction of the lead screw 593, i.e. one end of the actuator 591 in the axial direction, engages with the annular portion 599.

The annular portion 599 includes a circular opening, and a portion thereof in the circumferential direction engages with one end of the shell portion 597. The perimeter of the opening of the annular portion 599 includes a reflection preventing portion 577 that scatters the reflection angle of the emitted light.

As shown in FIG. 10, the actuator assembly 590 is fixed to the moving cylinder 580 as a result of the annular portion 599 of the case 598 being screwed to the flange 579 of the moving cylinder 580 by the stopping screw 592. Therefore, the case 598 is fixed to the moving cylinder 580, such that the case 598 moves together with the moving cylinder 580. The annular portion 599 surrounds the optical path of the light incident to the lens unit 500 to pass the incident light therethrough.

The annular portion 599 optically closes the gap between the first holding frame 522 holding the first lens group 520 and the second holding frame 532 holding the second lens group 530. In other words, when the lens unit 500 is viewed from the front, the reflection preventing portion 577 of the annular portion 599 appears between the first holding frame 522 and the second holding frame 532. Therefore, the flares are prevented from occurring in the lens unit 500.

As shown in FIG. 10, the shell portion 597 of the case 598 supports the lead screw 593 and the actuator 591 via the bracket 595, without directly touching the lead screw 593 and the actuator 591. Accordingly, the vibration occurring when the actuator 591 operates is propagated through the bracket 595 to the shell portion 597 of the case 598.

As a result, the vibration propagated from the actuator 591 to the shell portion 597 is sequentially propagated through the shell portion 597, the annular portion 599, and the moving cylinder 580. Accordingly, the vibration propagated as a result of these transferred vibrations is gradually decreased.

One end of the shell portion 597 in the longitudinal direction engages with the annular portion 599. The case 598 causes the annular portion 599 to be fixed to the moving cylinder 580. Accordingly, the shell portion 597 has a detachable configuration in which the end thereof engaged with the annular portion 599 serves as a pivot shaft for easy pivoting.

The actuator 591 is arranged closer to the annular portion 599 than the lead screw 593. However, the actuator 591 and the shell portion 597 are not directly in contact with each other. Accordingly, the vibration caused by the actuator 591 is propagated to the shell portion 597 through the bracket 595. With this configuration, the portion of vibration energy generated by the actuator 591 is absorbed by the pivoting on the shell portion 597, thereby attenuating the vibration propagated through the annular portion 599.

The drive force propagated to the second holding frame 532 from the lead screw 593 via the threaded component 534 acts in a direction parallel to the optical axis X. On the other hand, the vibration caused by the shell portion 597 held at one end acts in a direction substantially orthogonal to the optical axis X. Furthermore, the threaded component 534 elastically presses a lock tooth biased by a bias member against the lead screw 593. Accordingly, the effect of the vibration caused by the vibration of the actuator 591 on the control accuracy of the movement amount of the second holding frame 532 can be ignored.

Figure 14:
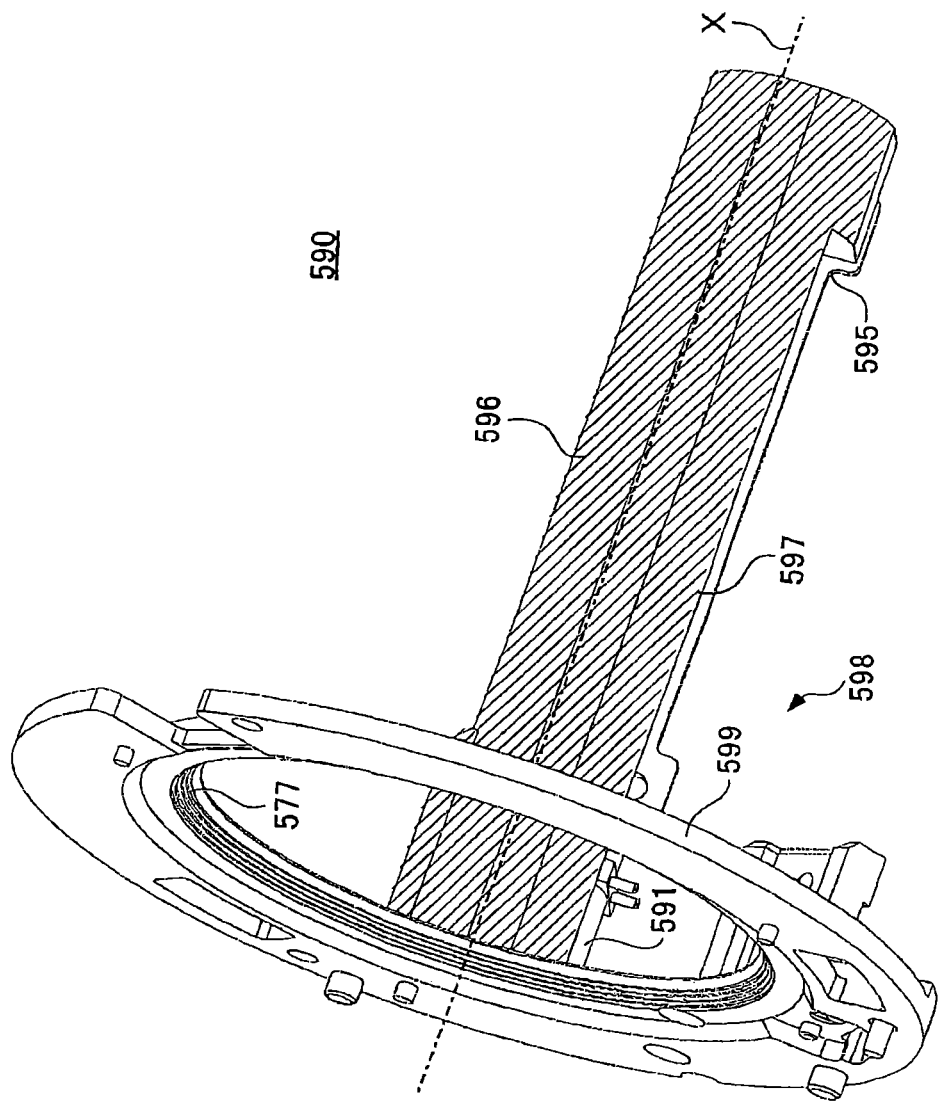
FIG. 14 is a perspective view of the actuator assembly 290.

FIG. 14 is a perspective view of the actuator assembly 590 as seen from another angle. Components that are the same as those in FIG. 13 are given the same reference numerals and redundant descriptions are omitted.

In the actuator assembly 590 shown in FIG. 14, the shell portion 597 of the case 598 is shown as seen from the side of the optical axis X of the lens unit 500. As shown in FIG. 14, a non-reflective surface 596 is arranged on the surface of the shell portion 597 facing the inner surface of the lens unit 500.

The non-reflective surface 596 can be formed by a matte black film. Instead, the non-reflective surface 596 can be formed by applying a non-reflective material such as molto-prene (registered trademark).

Components having metallic gloss on the surfaces thereof, such as the drive axle of the actuator 591 and the lead screw 593, are covered and hidden from the optical system of the lens unit 500 by the shell portion 597. As a result, stray light within the optical system of the lens unit 500 can be restricted. Furthermore, inner surface reflection can be restricted and flares can be prevented by providing the non-reflective surface 596 on the outer surface of the shell portion 597.

The area between the lead screw 593 and the optical system is blocked by the shell portion 597 of the case 598. Accordingly, a lubricant applied to the lead screw 593 can be prevented from splattering into the optical system due to the rotation of the lead screw 593. Accordingly, the optical system is kept clean and the desired characteristics can be maintained over a long period.

Figure 15:
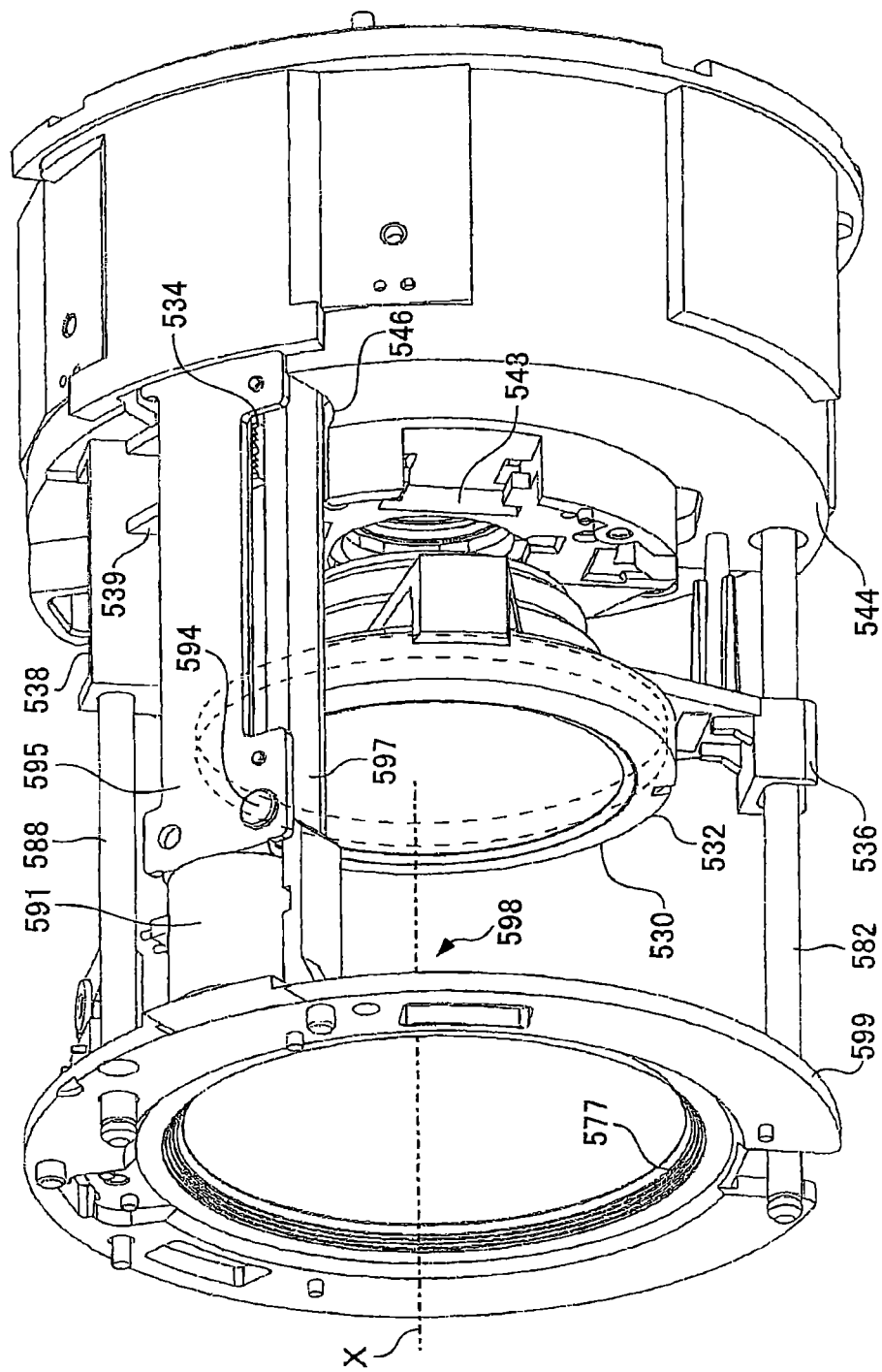
FIG. 15 is a perspective view of a portion of the internal configuration of the lens unit 500.

FIG. 15 is a perspective view of a portion of the internal configuration of the lens unit 500. Components that are the same as those in other drawings are given the same reference numerals, and redundant descriptions are omitted.

It should be noted that, relative to FIGS. 8 and 10, the lens unit 500 is rotated approximately 180 degrees on the optical axis X. As a result, the shell portion 597 of the case 598 in the actuator assembly 590 is positioned at the top in FIG. 15.

The internal configuration shown in FIG. 15 shows a state in which the fixed cylinder 510 and the moving cylinder 580 are removed from the lens unit 500. The engaging cylinder 544 fixed to the fixed cylinder 510 is positioned on the right side of FIG. 15. The actuator assembly 590 that moves in the direction of the optical axis X relative to the engaging cylinder 544 is arranged on the left side of FIG. 15.

As shown in FIG. 15, the second holding frame 532 is supported in a manner to be moveable in the direction of the optical axis X relative to the pair of guide axles 582 and 586, by the engaging portion 536 and the engaging portion 538. In other words, the second holding frame 532 engages with the guide axle 588 as a result of inserting the guide axle 588 into the engaging portion 538 having an engagement hole with an inner diameter substantially equal to the outer diameter of the guide axle 588. In this way, the engaging portion 538 moves along the guide axle 588.

The second holding frame 532 engages with the guide axle 582, via the engaging portion 536 having opposing surfaces with an interval therebetween substantially equal to the diameter of the guide axle 582. In this way, rotation of the second holding frame 532 around the guide axle 588 is prevented.

The connecting portion 539 extends from the engaging portion 538 in the circumferential direction of the lens unit 500. The connecting portion 539 extends from a slit formed in the side surface of the shell portion 597 of the case 598 to a region inside the shell portion 597, and engages with a threaded component 534 interlocking with the lead screw 593. With this configuration, drive force propagated from the lead screw 593 to the threaded component 534 when the actuator 591 is operated causes the second holding frame 532 to move in the direction of the optical axis X without tilting and without moving in a direction orthogonal to the optical axis X.

FIG. 15 shows a state in which the rear end of the case 598 begins to proceed into the housing portion 546 formed in the engaging cylinder 544. Specifically, the rear end of the shell portion 597 enters into the housing portion 546 without contacting an inner surface of the housing portion 546.

Figure 16:
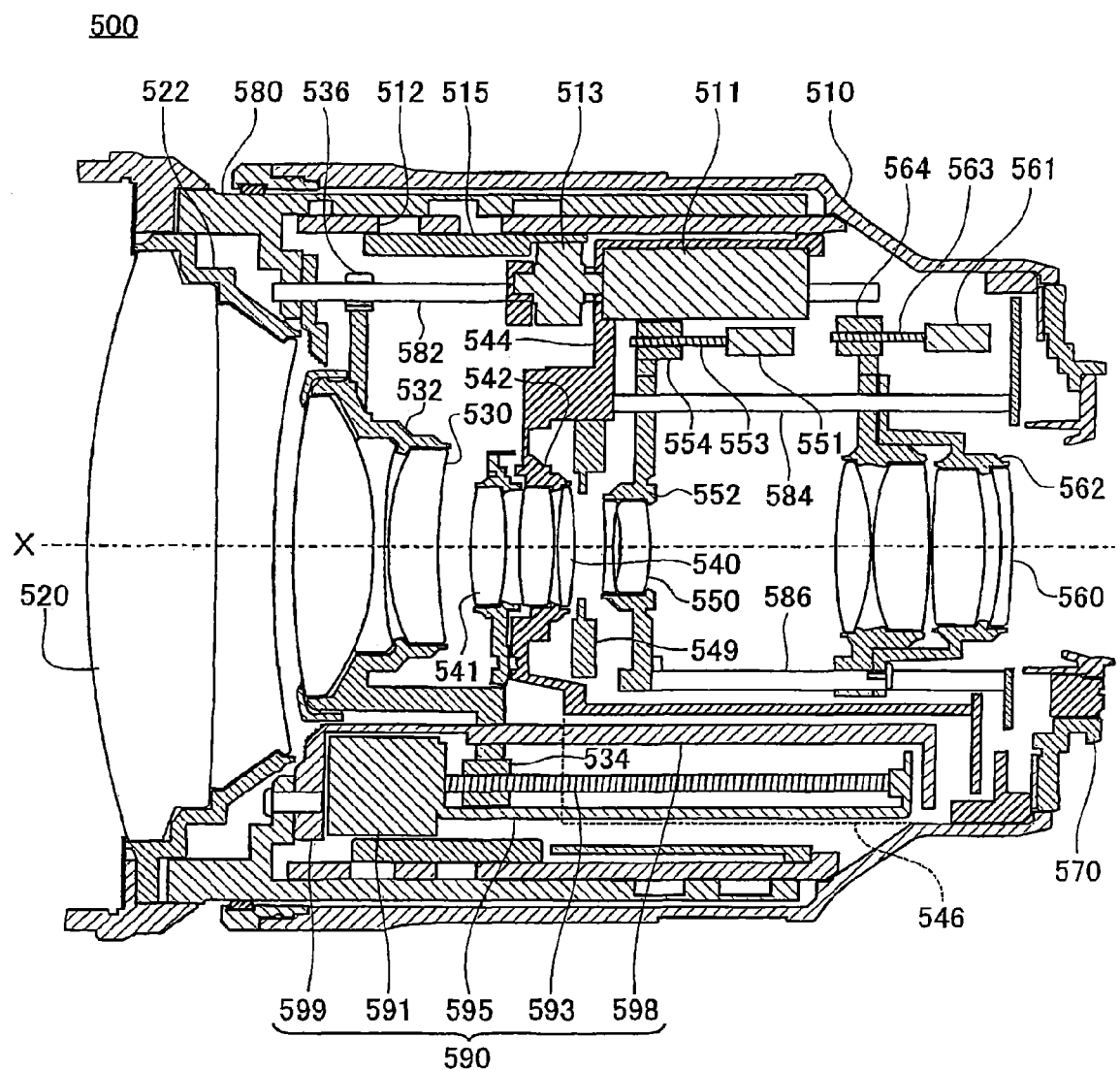
FIG. 16 is a schematic cross-sectional view of the lens unit 500.

FIG. 16 is a schematic cross-sectional view of the lens unit 500. Components that are the same as those in other drawings are given the same reference numerals, and redundant descriptions are omitted.

The lens unit 500 shown in FIG. 16 is in the contracted state. In other words, the moving cylinder 580 is moved backward from the extended state shown in FIG. 10, by operating the actuator 511 to rotate the drive ring 515. The first lens group 520 also moves backward in accordance with the backward motion of the moving cylinder 580, thereby decreasing the overall length of the lens unit 500.

The front end of the guide axle 582 engages with the moving cylinder 580. The guide axle 582 is supported by the fixed cylinder 510 in a manner to be slideable. The second holding frame 532 is supported by the guide axle 582. As already described above, the lead screw 593 and the actuator 591 engage with the case 598 via the bracket 595, and the case 598 is fixed to the moving cylinder 580.

Accordingly, when the actuator 511 is operated and the first holding frame 522 moves in the direction of the optical axis X along with the moving cylinder 580, the second lens group 530, the second holding frame 532, the guide axle 582, the lead screw 593, and the actuator 591 also move. As a result, the lens unit 500 enters the contracted state when the moving cylinder 580 moves backward.

In this way, the first lens group 520, the second lens group 530, and the third lens group 540 are brought closer to each other to achieve the contracted state in which the overall length of the lens unit 500 is reduced. Therefore, the lens unit 500 can be shortened for easier portability.

The second lens group 530 moves together with the moving cylinder 580, and therefore the moving cylinder 580 cannot move backward when the second lens group 530 is positioned near the rear end of the guide axle 582. Accordingly, when the moving cylinder 580 moves backward, the second lens group 530 is brought near the first lens group 520 before the moving cylinder 580 begins to move.

As already described above, when putting the lens unit 500 in the contracted state, the fourth lens group 550 and the fifth lens group 560 may be returned to the initial positions. Furthermore, vibration-proof lens 541 that does not move when the lens unit 500 is in the contracted state may be fixed.

With the lens unit 500 in the contracted state as described above, the shell portion 597 of the actuator assembly 590 enters into the housing portion 546 formed in the engaging cylinder 544. The shell portion 597 does not contact an inner surface of the housing portion 546. Accordingly, with the lens unit 500 in the contracted state, the cantilevered state of the shell portion 597 is maintained.

Instead of the lens unit 200 or 500 being a single lens reflex camera that is exchangeable on the camera body 300 or 600, the image capturing apparatus 100 or 400 may be a camera in which the lens unit 200 or 500 and the camera body 300 and 600 are formed integrally. The camera body 300 or 600 may be a mirrorless type of camera body 300 or 600 that does not include a mirror unit therein, and the internal configuration of the camera body 300 or 600 can be changed as needed.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A device comprising:
a lens barrel operable to change between a contracted state and an extended state, the lens barrel including:
a first optical member that moves in an optical axis direction to change one of focus and magnification prior to image capturing and during image capturing,
a first drive member including one of a stepping motor, a supersonic motor, and a voice coil motor that causes the first optical member to move in the optical axis direction along a drive axle during image capturing,
a second optical member that has the first drive member fixed thereto, moves in the optical axis direction only to change the lens barrel between the extended state and the contracted state, and is fixed at a position in the optical axis direction during image capturing,
a case that houses the drive axle, and
a second drive member that causes the second optical member, the first optical member, and the case to move in the optical axis direction when changing between the extended state and the contracted state, wherein
the case includes a first end that is fixed to the second optical member such that the case is in a cantilevered state.

2. The device according to claim 1, wherein the lens barrel further includes:
a fixed cylinder that houses the first optical member and the second optical member prior to image capturing, and
a moving cylinder that directly or indirectly holds the first optical member, the second optical member, and the first drive member, and moves between a state of being housed in the fixed cylinder and a state of protruding from the fixed cylinder, wherein
the second drive member causes the first optical member, the second optical member, and the first drive member to move integrally, by causing the moving cylinder to move relative to the fixed cylinder.

3. The device according to claim 1, wherein
the first drive member is a stepping motor, and
the second drive member is a DC motor.

4. The device according to claim 1, further comprising a third drive member that moves a third optical member separately from the first optical member and the second optical member.

5. The device according to claim 4, wherein
the first drive member moves the first optical member at least during a magnification changing operation, and
the third drive member moves the third optical member at least during a focusing operation.

6. The device according to claim 5, wherein
the third drive member is a voice coil motor.

7. The device according to claim 1, wherein
the first drive member moves the first optical member at least during a focusing operation.

8. The device according to claim 7, wherein
the first drive member includes at least one of a stepping motor and a voice coil motor.

9. The device according to claim 1, further comprising:
an image capturing section that captures image light from the lens barrel.

10. A device comprising:
a lens barrel operable to change between a contracted state and an extended state, the lens barrel including:
a lens holder that holds a lens,
a drive axle that drives the lens holder in a direction parallel to an optical axis of the lens to change one of focus and magnification,
a motor including one of a stepping motor, a supersonic motor, and a voice coil motor that applies a drive force to the drive axle,
a case that houses the drive axle, and
a movable member that moves integrally with the case in the direction of the optical axis only to change the lens barrel between the extended state and the contracted state, while supporting the case in a cantilevered manner at one end of the case in an axial direction of the drive axle.

11. The device according to claim 10, wherein the lens barrel further includes a fixed cylinder that supports the movable member in a manner to be movable in the direction of the optical axis.

12. The device according to claim 11, wherein the fixed cylinder includes a housing portion that, when the movable member moves in the direction of the optical axis, houses another end of the case in the axial direction, without contacting the case.

13. The device according to claim 10, wherein the case covers and hides the drive axle from the lens.

14. The device according to claim 10, wherein the case includes optical characteristics for restricting reflected light from being incident to the lens.

15. The device according to claim 10, wherein the movable member includes an annular portion through which passes light incident to the lens.

16. The device according to claim 15, wherein the movable member holds within the annular portion a lens that is separate from the lens held by the lens holder, and moves in a direction parallel to the optical axis together with the separate lens.

17. The device according to claim 10, further comprising:
an image capturing element that captures image light incident thereto through an optical system of the lens barrel.

18. A device comprising:
a central processing unit operable to execute instructions for
moving a first optical member driven by a first drive member in an optical axis direction along a drive axle to change one of focus and magnification prior to image capturing and during image capturing, the first drive member including one of a stepping motor, supersonic motor, and a voice coil motor, the drive axle being housed in a case, and moving a second optical member fixed to the first drive member that is driven by a second drive member along the optical axis only to change a lens barrel between an extended state and a contracted state, and is fixed at a position along the optical axis during image capturing, wherein moving the second optical member causes the first optical member and the case to move along the optical axis when changing the lens barrel between the extended state and the contracted state, and wherein the case includes a first end that is fixed to the second optical member such that the case is in a cantilevered state.

19. The device according to claim 1, wherein the lens barrel further includes a fixed cylinder that houses the first optical member and the second optical member prior to image capturing, and wherein the second drive member is arranged on an internal circumference side of the fixed cylinder closer to the fixed cylinder than the second optical member.

* * * * *